United States Patent
Choi

(10) Patent No.: US 11,173,907 B2
(45) Date of Patent: Nov. 16, 2021

(54) HYBRID VEHICLE CONTROL DEVICE, SYSTEM HAVING THE SAME AND METHOD THEREOF

(71) Applicants: Hyundai Motor Company, Seoul (KR); Kia Motors Corporation, Seoul (KR)

(72) Inventor: Jae Young Choi, Seoul (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 310 days.

(21) Appl. No.: 16/406,741

(22) Filed: May 8, 2019

(65) Prior Publication Data

US 2020/0180628 A1    Jun. 11, 2020

(30) Foreign Application Priority Data

Dec. 11, 2018    (KR) ........................ 10-2018-0159220

(51) Int. Cl.
*B60W 30/18*    (2012.01)
*B60W 20/40*    (2016.01)
*B60W 30/19*    (2012.01)

(52) U.S. Cl.
CPC ...... *B60W 30/18027* (2013.01); *B60W 20/40* (2013.01); *B60W 30/19* (2013.01); *B60W 2540/103* (2013.01)

(58) Field of Classification Search
CPC ....... B60W 20/00; B60W 20/19; B60W 20/30
See application file for complete search history.

(56) References Cited

U.S. PATENT DOCUMENTS

| | | | | |
|---|---|---|---|---|
| 2007/0102211 A1* | 5/2007 | Nozaki | ................... | B60L 50/16 180/65.7 |
| 2008/0076623 A1* | 3/2008 | Tabata | ................ | B60L 15/2054 477/5 |
| 2012/0053767 A1* | 3/2012 | Jeon | ....................... | B60W 10/11 701/22 |
| 2012/0053768 A1* | 3/2012 | Jeon | ...................... | B60W 10/02 701/22 |
| 2013/0184923 A1* | 7/2013 | Sawayama | ............ | B60W 20/00 701/22 |
| 2013/0253750 A1* | 9/2013 | Otake | ............. | B60W 30/18127 701/22 |
| 2013/0274976 A1* | 10/2013 | Suzuki | ............ | B60W 30/18027 701/22 |
| 2013/0311027 A1* | 11/2013 | Toyota | .................. | B60W 30/18 701/22 |

(Continued)

*Primary Examiner* — Thomas G Black
*Assistant Examiner* — Sara J Lewandroski
(74) *Attorney, Agent, or Firm* — Morgan, Lewis & Bockius LLP

(57) ABSTRACT

The present disclosure relates to a hybrid vehicle control device, a system including the same, and a method thereof. The hybrid vehicle control device according to an embodiment of the present disclosure includes a processor and storage. The processor sets a target engine speed and determines presence or absence of a kick down shift based on the vehicle driving situation, and performs engine clutch engagement control according to a result of the kick down shift. The storage stores the vehicle driving situation and a result of the determination of the presence or absence of the kick down shift.

18 Claims, 7 Drawing Sheets

(56) References Cited

U.S. PATENT DOCUMENTS

| | | | |
|---|---|---|---|
| 2014/0136039 A1* | 5/2014 | Tanishima | B60L 15/2054 |
| | | | 701/22 |
| 2015/0051767 A1* | 2/2015 | Mohri | B60L 50/16 |
| | | | 701/22 |
| 2015/0088348 A1* | 3/2015 | Lee | B60W 10/06 |
| | | | 701/22 |
| 2015/0134173 A1* | 5/2015 | Choi | B60W 20/40 |
| | | | 701/22 |
| 2015/0314775 A1* | 11/2015 | Dextreit | B60W 10/06 |
| | | | 701/22 |
| 2017/0015301 A1* | 1/2017 | Yamamoto | B60K 6/442 |
| 2017/0021824 A1* | 1/2017 | Johri | B60W 20/12 |
| 2017/0066437 A1* | 3/2017 | Yamamoto | B60K 6/543 |
| 2020/0023726 A1* | 1/2020 | Tsuda | F16H 61/686 |
| 2020/0172083 A1* | 6/2020 | Cho | B60W 30/18063 |

* cited by examiner

HYBRID VEHICLE CONTROL DEVICE, SYSTEM HAVING THE SAME AND METHOD THEREOF

CROSS-REFERENCE TO RELATED APPLICATION

This application is based on and claims the benefit of priority to Korean Patent Application No. 10-2018-0159220, filed on Dec. 11, 2018, in the Korean Intellectual Property Office, the disclosure of which is incorporated herein in its entirety by reference.

TECHNICAL FIELD

The present disclosure relates to a hybrid vehicle control device, a system having the same, and a method thereof, and more particularly, to technology for improving reaction with respect to overtaking or re-acceleration of a turbo engine-based hybrid vehicle.

BACKGROUND

Recently, turbo engine application and related technology according to downsizing have been developed to maximize fuel efficiency of vehicles. A turbocharger refers to a supercharger of an engine driven with exhaust gas, and the turbocharger is a combination of a supercharger and a turbine that drives the supercharger, so that the both are also collectively called turbo.

In the case of a turbo engine of a conventional gasoline vehicle, the engine is always operated and a certain back pressure is generated. However, in the case of a turbo engine of an eco-friendly vehicle, such as HEV, a back pressure is generated after the engine is started, an engine torque is stabilized, and a turbo operating point is reached through a kick down (K/D) in a turned-off state, thereby causing a problem that delay occurs upon acceleration.

That is, a conventional hybrid vehicle performs speed control for engine clutch engagement after engine starting when acceleration is requested as in FIG. 1. Engine clutch engagement and stabilization of a transmission clutch control pressure are performed and when a turbo operating point is reached after stabilization of an engine torque, a feeling of acceleration can be secured. As described above, when an engine clutch is engaged and a K/D shift occurs after engine starting for overtaking or re-acceleration, RPM increases to generate the back pressure and the turbo engine is operated to generate a feeling of acceleration. In the case of a turbo engine-based eco-friendly vehicle, there is a problem that delay is caused by being controlled in the above-described sequence when the overtaking or re-acceleration is requested.

SUMMARY

Embodiments of the present disclosure provide a hybrid vehicle control device, a system including the same, and a method thereof which improve reaction with respect to overtaking and re-acceleration through predictive control of an engine clutch of a turbo engine-based hybrid vehicle.

The technical problems to be solved by the present inventive concept are not limited to the aforementioned problems, and any other technical problems not mentioned herein will be clearly understood from the following description by those skilled in the art to which the present disclosure pertains.

According to an aspect of the present disclosure, a hybrid vehicle control device may include a processor configured to set a target engine speed and determine presence or absence of a kick down shift based on a vehicle driving situation, and perform engine clutch engagement control according to a result of the kick down shift, and a storage that stores the vehicle driving situation and a determined result of the presence or absence of the kick down shift, obtained by the processor.

The vehicle driving situation may include at least one of a driver's requested torque, a state of charge (SOC), a vehicle periphery situation, and a driver's driving tendency.

The processor may be further configured to obtain the driver's requested torque based on a result of detection of an accelerator pedal sensor.

The processor may be further configured to determine an engine operating point based on the vehicle driving situation, and to perform engine starting when the engine operating point reaches a predetermined reference value.

The processor may be further configured to determine whether a turbo operation is necessary based on the vehicle driving situation after the engine starting.

The processor may be further configured to set a turbo operation starting point to a target engine speed when it is determined that the turbo operation is necessary.

The processor may be further configured to determine whether there is a kick down shift request using a shift pattern based on a driver's requested torque and a vehicle speed.

The processor may be configured to perform engine clutch engagement control when the target motor speed is higher than the target engine speed due to the kick down shift in a case in which the processor determines that there is the kick down shift request.

The processor may be configured to again set the target engine speed to the target motor speed and to perform engine clutch engagement control when the target motor speed is higher than the target engine speed due to the kick down shift under a condition that there is no kick down shift.

The processor may be further configured to determine whether to perform a kick down shift based on a change amount in the vehicle driving situation or a difference between the target motor speed and the target engine speed when there is no kick down shift request.

The processor may be further configured to generate a target gear step by reducing a current gear step when the change amount in the vehicle driving situation is greater than a predetermined first reference vale or the difference between the target motor speed and the target engine speed is greater than a predetermined second reference value.

The processor may be further configured to compare the target motor speed with the target engine speed when there is the kick down shift request, and to again set a target gear step by reducing a current target gear step when the target motor speed is greater than the target engine speed.

In a case in which the change amount in the vehicle driving situation is equal to or less than a predetermined first reference vale or the difference between the target motor speed and the target engine speed is equal to or less than a predetermined second reference value, the processor may be further configured to determine whether the difference between the target motor speed and the target engine speed is greater than zero, and again set the target engine speed to a target speed and to perform engine speed control when the difference between the target motor speed and the target engine speed is equal to or less than zero.

The processor may increase a motor speed when the difference between the target motor speed and the target engine speed is greater than zero.

The processor may be further configured to determine whether an absolute value of the difference between the target motor speed and the target engine speed is equal to or less than a third predetermined reference value, and perform the engine clutch engagement control when the absolute value of the difference between the target motor speed and the target engine speed is equal to or less than the third predetermined reference value.

According to another aspect of the present disclosure, vehicle system includes a hybrid vehicle control device configured to set a target engine speed based on vehicle driving situation, determine presence or absence of a kick down shift based on the vehicle driving situation, and perform engine clutch engagement control according to a result of the kick down shift, and one or more sensors configured to sense a vehicle periphery situation and apply the vehicle periphery situation to the hybrid vehicle control device.

According to still another aspect of the present disclosure, a hybrid vehicle control method includes setting a target engine speed based on a vehicle driving situation, determining presence or absence of a kick down shift based on the vehicle driving situation, and performing engine clutch engagement control according to a result of the kick down shift.

The setting of the target engine speed may include calculating an engine operating point based on a driver's requested torque and a state of charge (SOC) state and starting an engine when the engine operating point reaches a predetermined reference value, determining whether a turbo operation is necessary based on the driver's requested torque and the SOC state, and setting a turbo operation starting point to the target engine speed when the turbo operation is necessary.

The performing of the engine clutch engagement control may include performing the engine clutch engagement control when a target motor speed is higher than a target engine speed due to the kick down shift in a case in which there is a request for the kick down shift.

The performing of the engine clutch engagement control may include again setting the target engine speed to the target motor speed when the target motor speed is higher than the target engine speed, and performing the engine clutch engagement control, in a case in which there is no request for the kick down shift.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
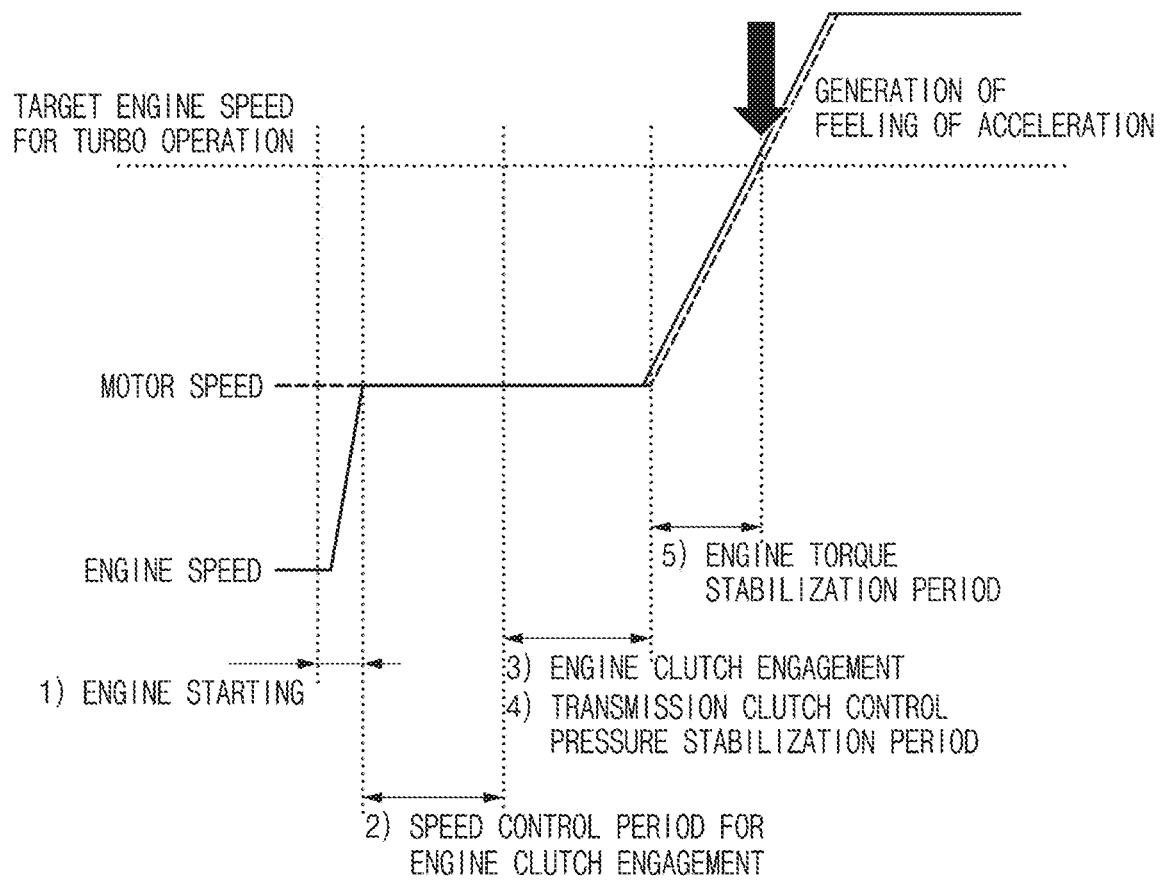
FIG. 1 is a diagram for describing problems of a conventional turbo engine-based hybrid vehicle.

Hereinafter, exemplary embodiments of the present disclosure will be described in detail with reference to the accompanying drawings. It should be noted that in giving reference numerals to elements of each drawing, like reference numerals refer to like elements even though like elements are shown in different drawings. In addition, a detailed description of well-known features or functions will be ruled out in order not to unnecessarily obscure the gist of the present disclosure.

In addition, terms, such as first, second, A, B, (a), (b) or the like may be used herein when describing components of the present disclosure. Each of these terminologies is not used to define an essence, order or sequence of a corresponding component but used merely to distinguish the corresponding component from other component(s). Although not differently defined, entire terms including a technical term and a scientific term used here have the same meaning as a meaning that may be generally understood by a person of common skill in the art. It is additionally analyzed that terms defined in a generally used dictionary have a meaning corresponding to a related technology document and presently disclosed contents and are not analyzed as an ideal or very official meaning unless stated otherwise.

The present disclosure discloses a configuration for improving reaction with respect to overtaking or re-acceleration through predictive control of an engine clutch of a turbo engine-based hybrid vehicle. The turbo engine-based hybrid vehicle may include a turbocharger that is a supercharger of an engine driven with exhaust gas and may include a device into which the supercharger and a turbine that drives the supercharger are combined.

Embodiments of the present disclosure will be described below in detail with reference to FIGS. 2 to 7.

Figure 2:
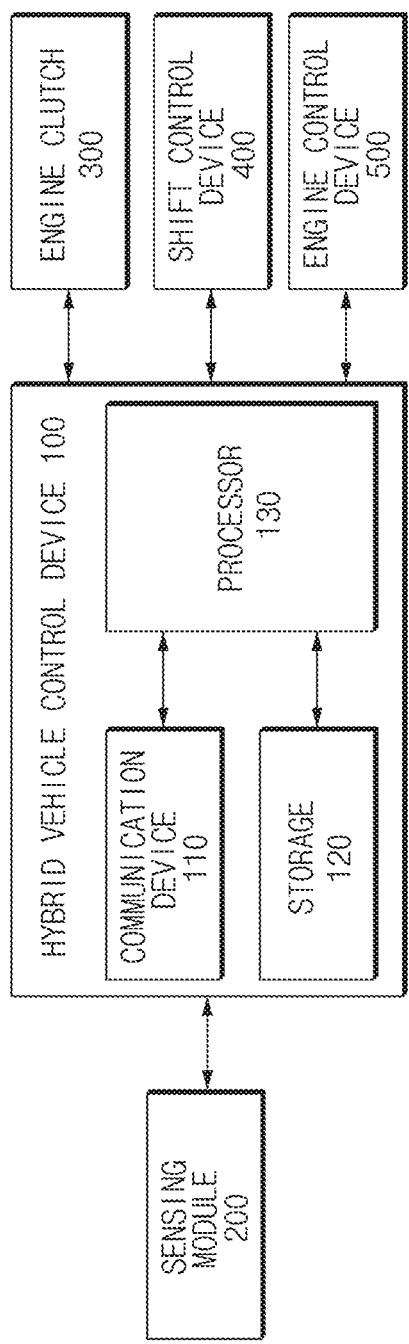
FIG. 2 is a block diagram of a configuration of a vehicle system including a hybrid vehicle control device according to an embodiment of the present disclosure.

FIG. 2 is a block diagram of a configuration of a vehicle system including a hybrid vehicle control device according to an embodiment of the present disclosure.

Referring to FIG. 2, a vehicle system according to an embodiment of the present disclosure may include a hybrid vehicle control device 100, a sensing module 200, an engine clutch 300, a shift control device 400, and an engine control device 500.

The hybrid vehicle control device 100 may set a target engine speed based on a vehicle driving situation, determine presence or absence of a kick down shift, and perform engine clutch engagement control according to a result of the kick down shift.

In this case, kick down shift control may include lowering a gear shift by one step to shift to a low-speed gear to increase acceleration force when a user depresses an accelerator pedal (an acceleration pedal) deeply.

The hybrid vehicle control device 100 may include a communication device 110, storage 120, and a processor 130.

The communication device 110 is a hardware device implemented using various electronic circuits to transmit and receive signals via wireless or wired connections. In the present disclosure, the communication device 110 may perform in-vehicle communication through Controller Area Network (CAN) communication, Local Interconnect Network (LIN) communication, or the like and may perform communication with the sensing module 200, a steering engine clutch 300, an engine control device 500, or the like.

The storage 120 may store information such as vehicle driving situation which is sensed by the sensing module 200 and a result of determination of presence or absence of a kick down shift, a result of determination of whether a turbo operation is necessary, a target gear step, a target motor speed, a target engine speed, or the like, which is obtained by the processor 130. In this case, the target engine speed means a speed which the engine has to reach for driving of the vehicle, and the target motor speed may include a speed which the motor has to reach or driving of the vehicle. The storage 120 may include at least one type of storage medium of memories such as a flash memory type memory, a hard disk type memory, a micro type memory, and a card type memory (e.g., an SD card (Secure Digital Card) or an XD card (eXtream Digital Card)), a RAM (Random Access Memory), an SRAM (Static RAM), a ROM (Read Only Memory), a PROM (Programmable ROM), a EEPROM (Electrically Erasable PROM), a MRAM (Magnetic RAM), and an optical disk type memory.

The processor 130 may be electrically connected to the communication device 110, the storage 120, or the like, and may electrically control each of components. The processor 130 may be electrical circuits which execute software instructions and therefore perform various data processing and calculation, which will be described below.

The processor 130 may set a target engine speed based on the vehicle driving situation, determine presence or absence of a kick down shift and perform engine clutch engagement control according to a result of the kick down shift. In this case, the vehicle driving situation may include at least one of a driver's requested torque (a force or a speed at which the driver depresses an accelerator), a State Of Charge (SOC, a battery charging state), a vehicle periphery situation (presence or absence of a preceding vehicle, presence or absence of a rear vehicle, presence or absence of a vehicle in the next lane, a relative speed and relative distance of a surrounding vehicle, or the like), and a driver driving tendency (aggressive, mild, normal). In addition, the processor 130 may obtain the driver's requested torque based on a result of sensing of the accelerator pedal sensor.

The processor 130 may calculate an engine operating point based on the vehicle driving situation and perform engine starting when the engine operating point reaches a predetermined reference value. In addition, the processor 130 may determine whether a turbo operation is necessary based on the vehicle driving situation after engine starting. The engine operating point is a point at which engine starting begins, and when the engine operating point is reached, an engine may be started.

The processor 130 may set a turbo operation starting point at which the turbo operation is started to a target engine speed when it is determined that the turbo operation is necessary. In this case, the turbo operation starting point is a point at which the turbo operation is started, and when the engine speed reaches the turbo operation starting point, the turbo operation may be started.

The processor 130 may determine a kick down shift request using a shift pattern based on the driver's requested torque and a vehicle speed.

The processor 130 may perform engine clutch engagement control when the target motor speed is higher than the target engine speed due to the kick down shift in a case where there is a kick down shift request. In addition, the processor 130 may compare the target motor speed with the target engine speed when there is the kick down shift request. When the target motor speed is greater than the target engine speed, the processor 130 may again set a target gear step by reducing a current target gear step.

The processor 130 may perform engine clutch engagement control after the target engine speed is again set to the target motor speed when the target motor speed is higher than the target engine speed under condition that there is no kick down shift.

The processor 130 may determine whether to perform a kick down shift based on a change amount in the vehicle driving situation and a difference between the target motor speed and the target engine speed when there is no kick down shift request. The processor 130 may generate a target gear step by lowering a current gear step by one step when a change amount in the vehicle driving situation (a change amount in the driver's requested torque, a change amount in a distance from a surrounding vehicle, or the like) is greater than a predetermined first reference value A or a difference between the target motor speed and the target engine speed is greater than a predetermined second reference value B. In this case, the processor 130 may obtain a change mount in the driver's requested torque based on an APS change amount.

The processor 130 may determine whether the difference between the target motor speed and the target engine speed is greater than zero when the change amount in the vehicle driving situation is equal to or less than the predetermined first reference value or the difference between the target motor speed and the target engine speed is equal to or less than the predetermined second reference value. When the difference between the target motor speed and the target engine speed is equal to or less than zero, the processor 130 may again set the target engine speed to the target speed, and perform engine speed control. In addition, the processor 130 may increase a motor speed when the difference between the target motor speed and the target engine speed is greater than zero.

The processor 130 may determine whether the absolute value of the difference between the target motor speed and the target engine speed is equal to or less than a predetermined third reference value. When the absolute value of the difference between the target motor speed and the target engine speed is equal to or less than the predetermined third reference value, the processor 130 may perform the engine clutch engagement control.

The sensing module 200 may include one or more sensors which may be an accelerator pedal sensor (APS) for detecting a speed and a force at which a driver depresses an accelerator pedal, an ultrasonic sensor that detects an object outside a vehicle, a radar, a camera, a laser scanner and/or a corner radar, a lidar, an acceleration sensor, a yaw rate sensor, a torque measurement sensor and/or a wheel speed sensor, a steering angle sensor, and the like.

The engagement of the engine clutch 300 may be controlled by the hybrid vehicle control device 100.

The shift control device 400 may perform a clutch operation and control of a shift gear step in conjunction with the hybrid vehicle control device 100.

The engine control device 500 may be configured to control the driving of a vehicle engine and may include a controller configured to control a vehicle speed.

Figure 3:
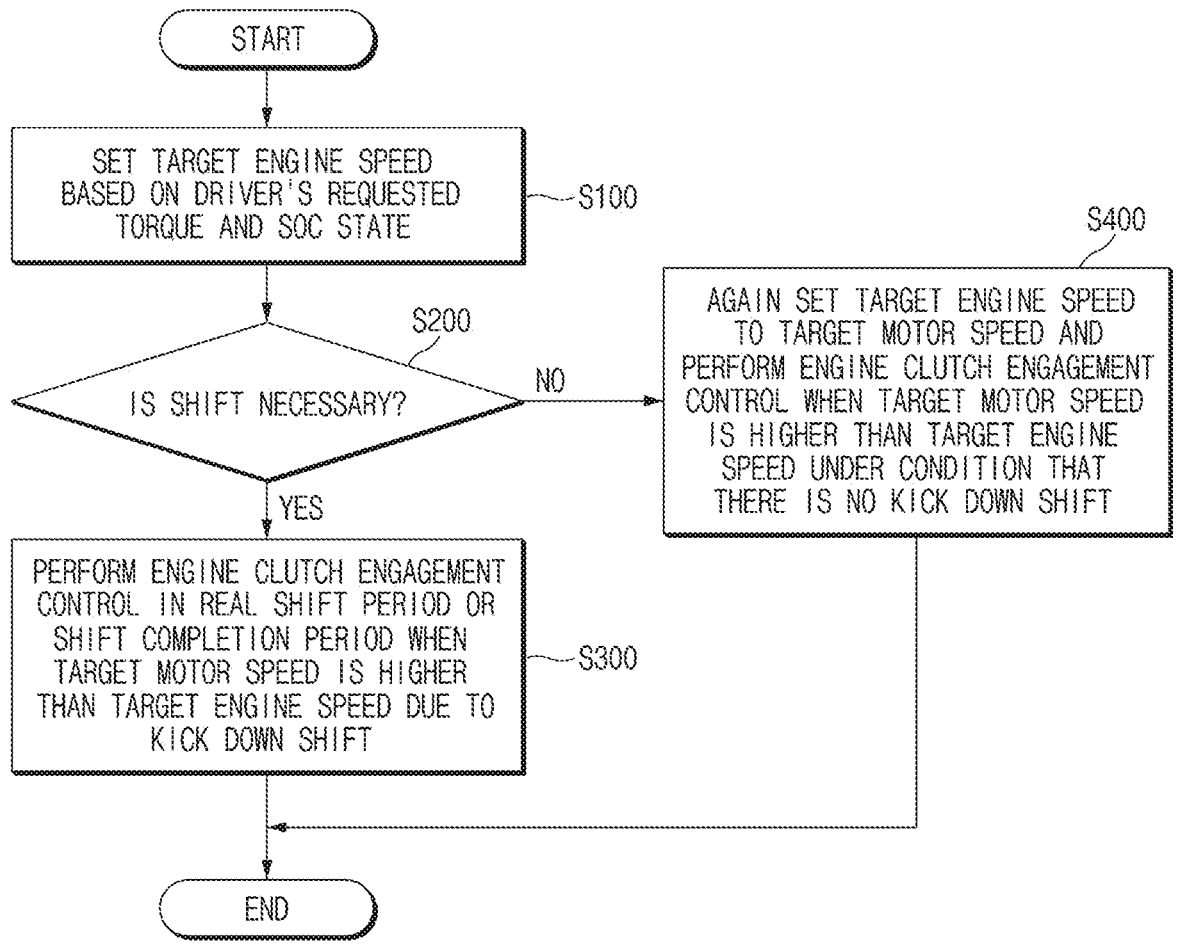
FIG. 3 is a flowchart of a hybrid vehicle control method, according to an embodiment of the present disclosure.
Figure 4:
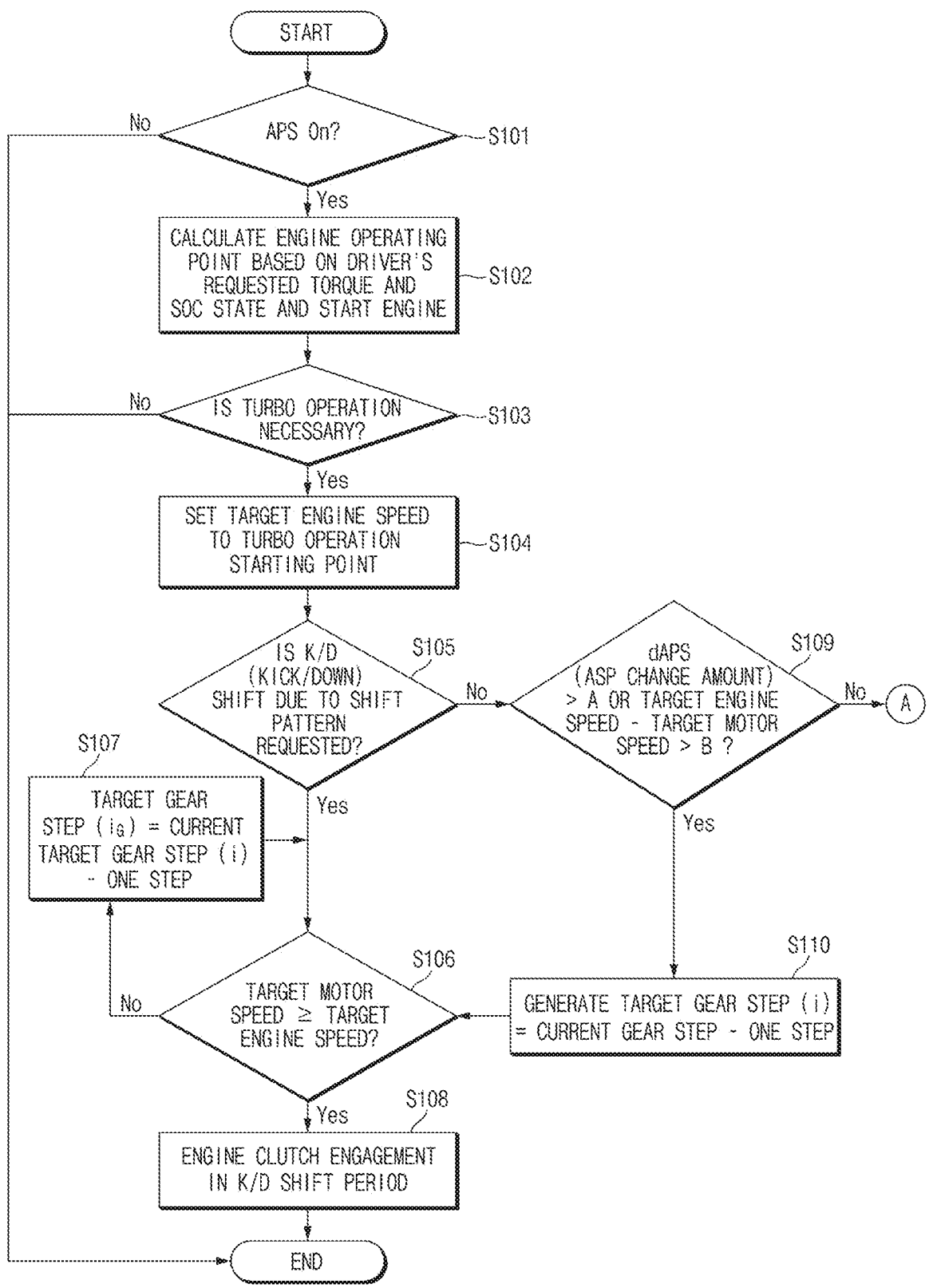
FIG. 4 is a flowchart of a hybrid vehicle control method using a kick down shift, according to an embodiment of the present disclosure.
Figure 5:
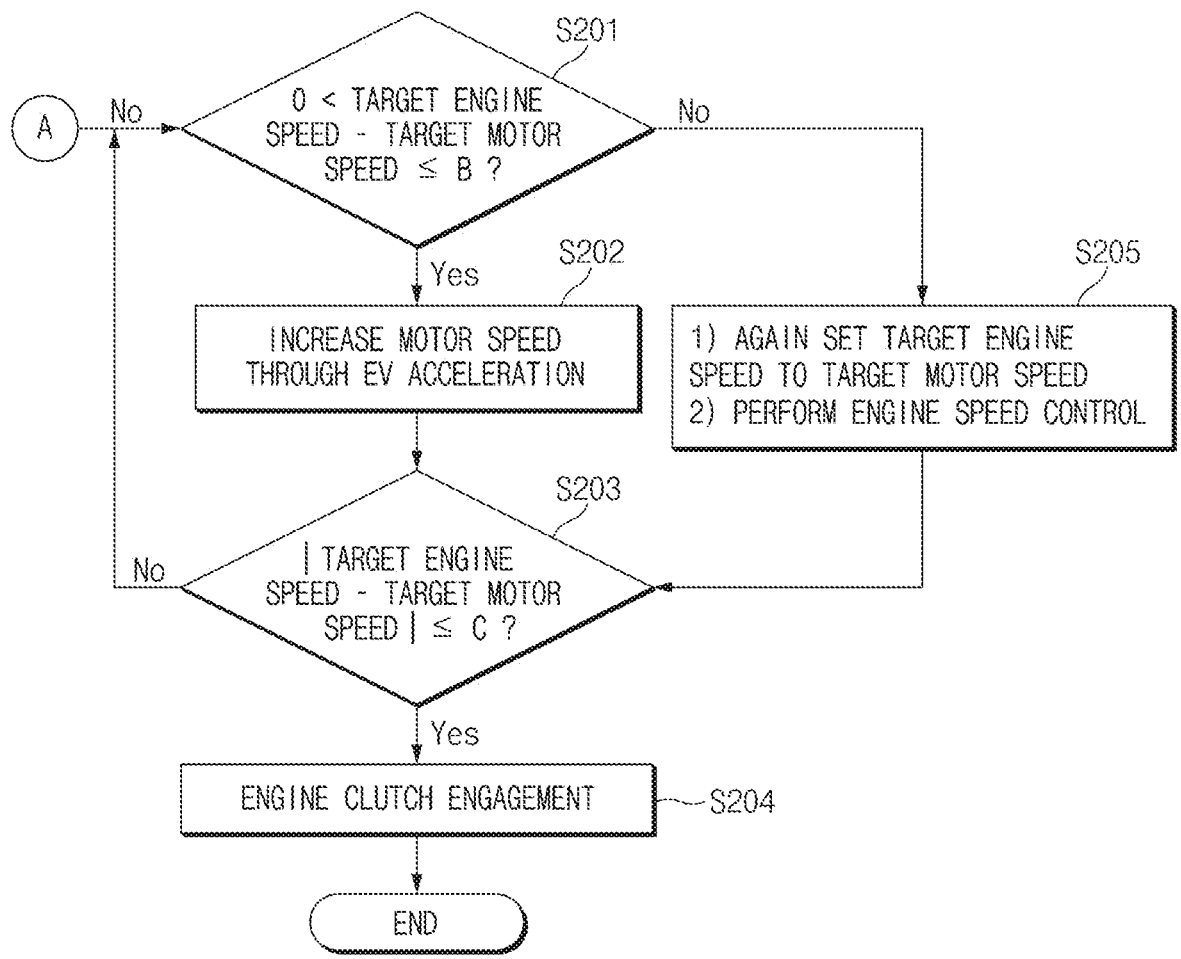
FIG. 5 is a flowchart of a hybrid vehicle control method under condition that there is no kick down shift, according to an embodiment of the present disclosure.

A hybrid vehicle control method according to an embodiment of the present disclosure will be described in detail with reference to FIGS. 3 to 5. FIG. 3 is a flowchart of a hybrid vehicle control method, according to an embodiment of the present disclosure, FIG. 4 is a flowchart of a hybrid vehicle control method using a kick down shift, according to an embodiment of the present disclosure, and FIG. 5 is a flowchart of a hybrid vehicle control method under condition that there is no kick down shift, according to an embodiment of the present disclosure.

It is hereinafter assumed that the hybrid vehicle control device 100 of FIG. 1 performs processes of FIGS. 3, 4, and 5. In addition, it is understood that operations described with reference to FIGS. 3 to 5 as being performed by a device are controlled by the processor 130 of the hybrid vehicle control device 100.

The hybrid vehicle control device 100 may set a target engine speed based on a driver's requested torque and an SOC state (S100). In this case, the hybrid vehicle control device 100 may turn engine starting and determine whether a turbo operation is necessary by referring the driver's requested torque (from APS) and set a turbo operation starting point at which a back pressure is generated for turbo operation to the target engine speed when the turbo operation is necessary.

The hybrid vehicle control device 100 may determine whether a shift is necessary based on a kick down request by a shift pattern, a change amount in a driver's requested torque, a target engine speed, and a target motor speed (S200). The hybrid vehicle control device 100 may determine whether kick down control is necessary to reach the target engine speed by referring an APS change amount or a shift pattern (w/APS absolute value).

In a case where a shift is necessary, the hybrid vehicle control device 100 may perform engine clutch engagement control in a kick down actual shift period or a shift completion period when the target motor speed is higher than the target engine speed due to the kick down shift (S300).

On the other hand, in a case where a shift is not performed, the hybrid vehicle control device 100 may set the target engine speed to the target motor speed and perform engine clutch engagement control when the target motor speed is higher than the target engine speed under condition that there is no kick down shift.

In FIG. 4, a step of setting a target engine speed (S100), a step of determining whether a shift is necessary (S200), and a step of performing engine clutch engagement control due to the kick down shift (S300) of FIG. 3 are represented in detail.

Referring to FIG. 4, the hybrid vehicle control device 100 may determine whether an accelerator pedal sensor (APS) is turned on during driving in an EV mode (S101). That is, the hybrid vehicle control device 100 may determine whether a user depresses an accelerator pedal through the accelerator pedal sensor during driving in the EV mode.

When the accelerator pedal sensor is turned on, the hybrid vehicle control device 100 may calculate an engine operating point based on a driver's requested torque and an SOC state and start an engine when the engine operating point is reached (S102). At the time of engine starting, the shift control device 400 may stabilize a transmission clutch control pressure. In addition, the hybrid vehicle control device 100 may know the driver's requested torque based on a degree of depression of the accelerator pedal. In addition, the hybrid vehicle control device 100 may start the engine when the driver's requested torque is large or the SOC state is insufficient. Further, the hybrid vehicle control device 100 may calculate the engine operating point based on the driver's requested torque and the SOC state, or may calculate the engine operating point according to the vehicle periphery situation or the driver tendency. The engine operating point is a point at which engine starting begins, and when the engine operating point is reached, an engine may be started.

Thereafter, the hybrid vehicle control device 100 may determine whether a turbo operation is necessary (S103). In this case, the turbo operation is for further increasing an engine output of a vehicle, and the turbo operation may be required when the driver's requested torque is very large. When the driver's requested torque is 100%, the engine may be driven at 50% and the motor may be driven at 50%. When the SOC state is not sufficient, a case may occur in which the engine is driven at 70% and the motor is driven only at 30%. In this case, the turbo engine may be required to be driven for driving of the engine.

Subsequently, when it is determined that the turbo operation is necessary, the hybrid vehicle control device 100 may set a target engine speed to the turbo operation starting point (S104). In this case, the turbo operation starting point is a point at which the turbo operation is started, and when the engine speed reaches the turbo operation starting point, the turbo operation may be started.

The steps S101 to S104 specify the step S100 of setting the target engine speed of FIG. 3. Although an example of setting a target engine speed based on the driver's requested torque and the SOC state is illustrated in the steps S101 to S104, the hybrid vehicle control device 100 may set the target engine speed through recognition of surrounding vehicles using a device such as a front or rear radar of the sensing module 200, instead of the driver's requested torque in another embodiment. In still another embodiment, the hybrid vehicle control device 100 may set the target engine speed according to the driver tendency (aggressive, normal, mild) instead of the driver's requested torque.

The hybrid vehicle control device 100 may determine whether a kick down (K/D) request due to a shift pattern occurs (S105). In this case, the hybrid vehicle control device 100 may determine whether a kick down request occurs based on a vehicle speed and the driver's requested torque.

The hybrid vehicle control device 100 may determine whether the target motor speed is greater than or equal to the target engine speed when the kick down request due to a shift pattern occurs (S106).

When the target motor speed is greater than or equal to the target engine speed, the hybrid vehicle control device 100 may perform engine clutch engagement control in a kick down shift period or a shift completion period (S108).

On the other hand, when the target motor speed is less than the target engine speed, the hybrid vehicle control device 100 may set a target gear step ($i_G$) by subtracting one step from a current target gear step (S107) and repeatedly perform the steps S106 to S108.

When the kick down request due to a shift pattern does not occur in step S105, the hybrid vehicle control device 100 may determine whether an APS change amount (a change amount in a driver torque) is greater than a predetermined reference value A or a difference between the target engine speed and the target motor speed is greater than a predetermined reference value B (S109). In this case, it may be determined that the APS change amount (the change amount in a driver torque) may be greater than the predetermined reference value A when the user suddenly depresses an accelerator pedal, and there is a high possibility that the user again depresses the accelerator pedal. In addition, the reference value B may be for example, 50 RPM. That is, it may be determined whether the difference between the target engine speed and the target motor speed is greater than 50 RPM.

The hybrid vehicle control device 100 may calculate a target gear step (i) when the APS change amount (the change amount in the driver torque) is greater than the predetermined reference value A or the difference between the target engine speed and the target motor speed is greater than the predetermined reference value B (S110). The target gear step (i) may include a gear step obtained by subtracting one step from a current gear step. That is, when the user rapidly depresses the accelerator pedal, it is determined that there is a high possibility that the user again depresses the accelerator pedal, and therefore, shift control may be performed. In another embodiment, the hybrid vehicle control device 100 may determine whether a shift is necessary by recognizing surrounding vehicles using a device, such as a front and rear radar of the sensing module 200, instead of the APS change mount (the change mount in a driver torque). In still another embodiment, the hybrid vehicle control device 100 may determine whether a shift is necessary according to driver tendency (aggressive, normal, mild) instead of the APS change mount (the change mount in a driver torque). For example, it may be determined whether a shift is necessary using a distance from a surrounding vehicle or the like, in a case in which there is a possibility that the user further depresses the accelerator pedal when there is a following vehicle in the rear area and there is a vehicle ahead, a case in which there is a vehicle ahead and there is no vehicle in the right lane, or the like.

After calculation of the target gear step, the hybrid vehicle control device 100 may repeatedly perform steps S106 to S108 to forcibly perform kick down.

The above-described steps S105, S109, S110, and S107 specify the step of determining whether a shift is necessary (S200) and generating a target gear step, and steps S106 and S108 specify the step of controlling engine clutch engagement through a kick down shift In FIG. 5, a step of controlling engine clutch engagement control under condition that there is no kick down shift of FIG. 3 (S400) is illustrated specifically.

Referring to FIG. 5, the hybrid vehicle control device 100 may determine whether the difference between the target engine speed and the target motor speed is a value between a predetermined reference value B and zero (S201). For example, it may be determined whether the difference between the target engine speed and the target motor speed is between 0 and 50.

When the difference between the target engine speed and the target motor speed is a value between the predetermined reference value B and zero, a motor speed may be increased by EV acceleration (S202). That is, when the difference between the target engine speed and the target motor speed is small, or when the target motor speed is slightly less than the target engine speed, it may be possible to increase a motor speed (vehicle speed) so that the target motor speed reaches the target engine speed.

The hybrid vehicle control device 100 may determine whether the absolute value of a value, obtained by subtracting the target motor speed from the target engine speed, is equal to or less than a reference vale C (S203). In this case, the reference value C may be 30 RPM. That is, the hybrid vehicle control device 100 may perform engine clutch engagement control when the difference between the target motor speed and the target engine speed is very small (S204).

When the difference between the target engine speed and the target motor speed is not a value between the predetermined reference value B and zero in step S201, the hybrid vehicle control device 100 may again set the target engine speed to the target motor speed, and perform engine speed control (S205).

Figure 6:
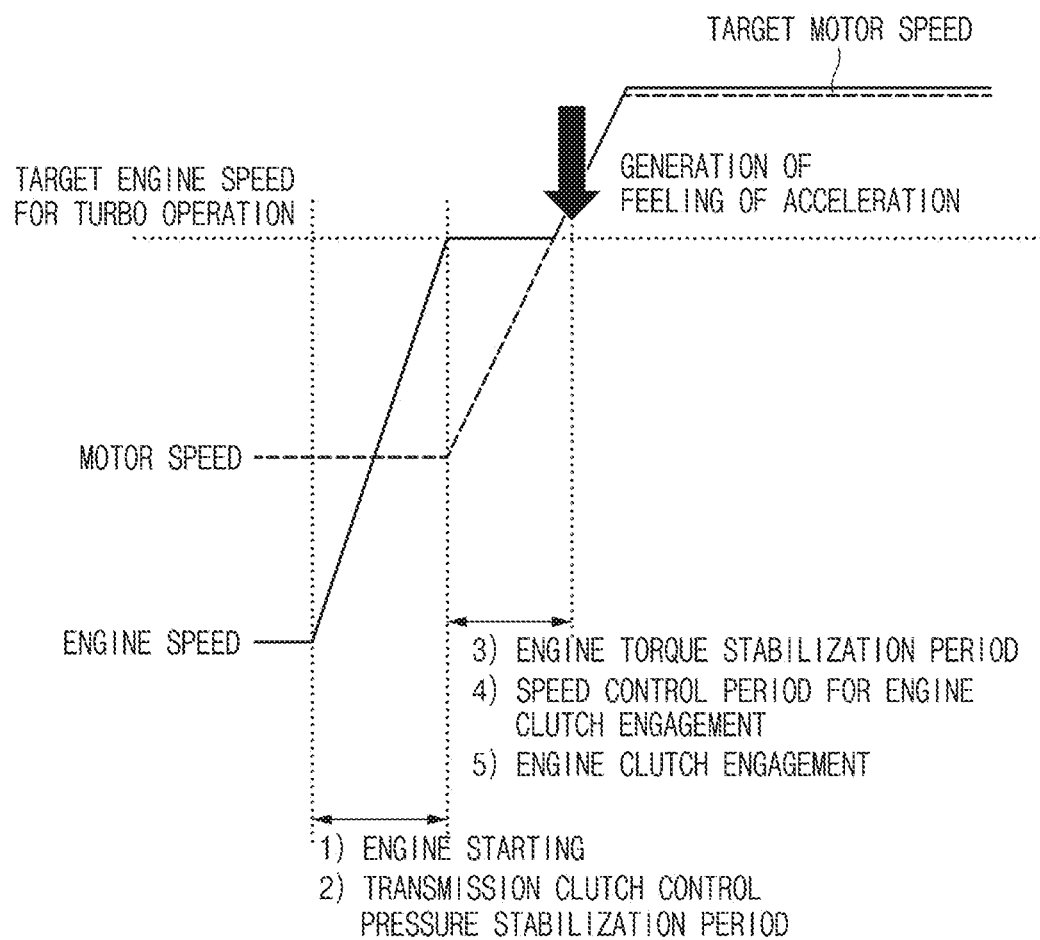
FIG. 6 is a diagram for describing an exemplary operation of a hybrid vehicle control device according to an embodiment of the present disclosure.

FIG. 6 is a diagram for describing an exemplary operation of a hybrid vehicle control device, according to an embodiment of the present disclosure.

Referring to FIG. 6, a time point at which an engine clutch is engaged is advanced compared to that of FIG. 1 since an engine starting period by the hybrid vehicle control device 100 overlaps a transmission clutch control pressure stabilization period by the shift control device 400 and an engine clutch speed control period by the hybrid vehicle control device 100 overlaps an engine torque stabilization period. In this way, it is possible to secure a feeling of acceleration through a turbo operation immediately after engine clutch is engaged.

As described above, the hybrid vehicle according to the present disclosure may drive an engine at a turbo operating point in the un-engagement state of an engine clutch at the time of engine starting and secure a feeling of acceleration through acceleration using a motor torque, kick down control in an EV mode, or engine clutch engagement, thereby shortening acceleration time compared to the prior art. In addition, the present disclosure may reduce acceleration delay compared to the conventional technology and prevent frequent shift operations by a user.

Figure 7:
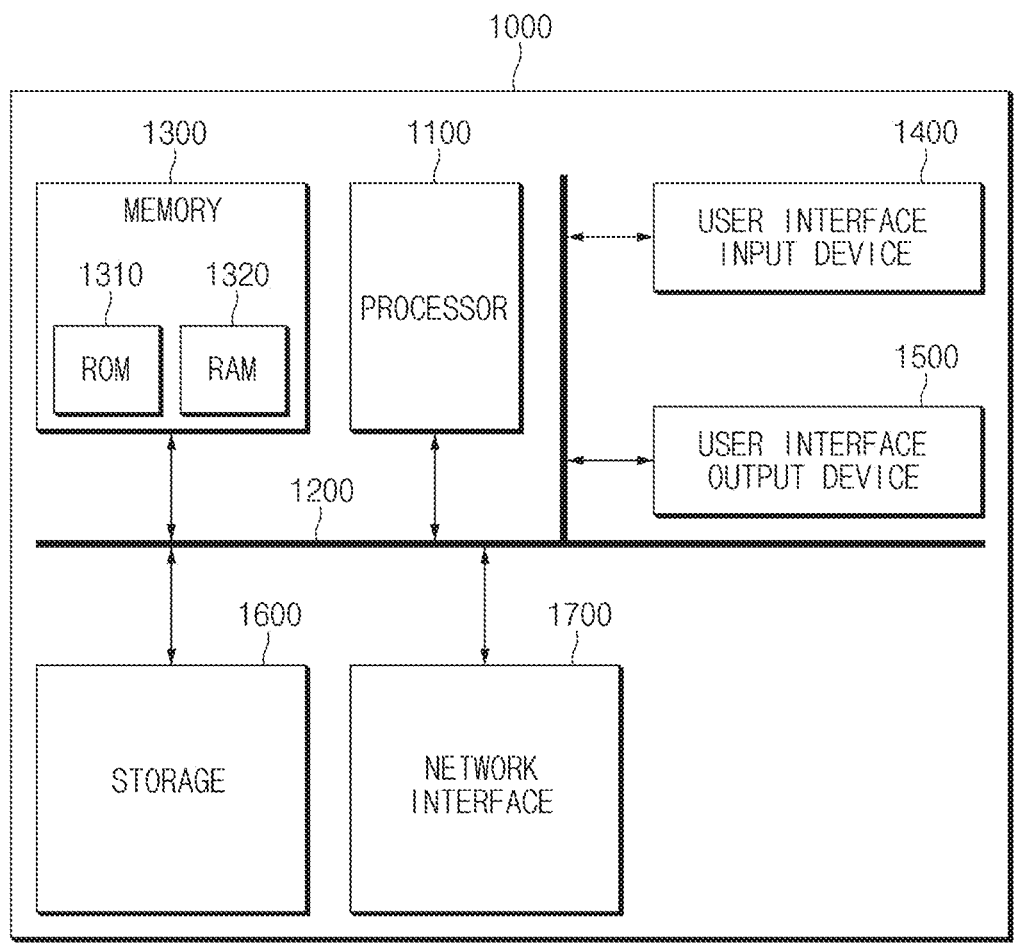
FIG. 7 illustrates a computing system according to an embodiment of the present disclosure.

FIG. 7 illustrates a computing system according to an embodiment of the present disclosure.

Referring to FIG. 7, a computing system 1000 may include at least one processor 1100, a memory 1300, a user interface input device 1400, a user interface output device 1500, storage 1600, and a network interface 1700, which are connected via a bus 1200.

The processor 1100 may be a semiconductor device for performing a processing for instructions stored in a central processing unit (CPU) or the memory 1300 and/or the storage 1600. The memory 1300 and the storage 1600 may include various types of volatile and nonvolatile storage media. For example, the memory 1300 may include a Read Only Memory (ROM) and a Random Access Memory (RAM).

Thus, the steps of the method or the algorithm described in association with the embodiments disclosed herein may be directly implemented by a hardware, a software module, or a combination of the two executed by the processor 1100. The software module may reside in a storage medium (i.e., in the memory 1300 and/or the storage 1600) such as a RAM memory, a flash memory, a ROM memory, an EPROM memory, an EEPROM memory, a register, a hard disk, a removable disk, and CD-ROM.

The exemplary storage medium may be coupled to the processor 1100, and the processor 1100 may read information from the storage medium and write information to the storage medium. Alternatively, the storage medium may be integrated in the processor 1100. The processor and the storage medium may reside in an application specific integrated circuit (ASIC). The ASIC may reside in a user terminal. Alternatively, the processor and the storage medium may reside in the user terminal as an individual component.

The present technology can improve reaction with respect to overtaking and re-accelerator through predictive control for an engine clutch of a turbo engine-based hybrid vehicle.

In addition, various effects can be provided which are directly or indirectly understood through the present disclosure.

The foregoing description is merely illustrative of the technical idea of the present disclosure, and various changes and modifications may be made by those skilled in the art without departing from the essential characteristics of the present disclosure.

Accordingly, the embodiments disclosed herein are merely illustrative and are not intended to limit the technical concept of the present disclosure, and the scope of the technical idea of the present disclosure is not limited to the embodiments. The scope of protection of the present disclosure is to be interpreted by the following claims, all spirits within a scope equivalent will be construed as included in the scope of the present disclosure.

What is claimed is:

1. A hybrid vehicle control device comprising:
    a processor configured to set a target engine speed and determine presence or absence of a kick down shift based on a vehicle driving situation, and perform engine clutch engagement control according to a result of the kick down shift; and
    a storage configured to store the vehicle driving situation and a determined result of the presence or absence of the kick down shift, obtained by the processor,
    wherein the processor is further configured to perform the engine clutch engagement control when a target motor speed is higher than the target engine speed due to the kick down shift in a case in which the processor determines that there is a kick down shift request.

2. The hybrid vehicle control device of claim 1, wherein the vehicle driving situation includes at least one of a driver's requested torque, a state of charge (SOC), a vehicle periphery situation, and a driver's driving tendency.

3. The hybrid vehicle control device of claim 2, wherein the processor is further configured to obtain the driver's requested torque based on a result of detection of an accelerator pedal sensor.

4. The hybrid vehicle control device of claim 1, wherein the processor is further configured to determine an engine operating point based on the vehicle driving situation, and to perform engine starting when the engine operating point reaches a predetermined reference value.

5. The hybrid vehicle control device of claim 1, wherein the processor is further configured to determine whether a turbo operation is necessary based on the vehicle driving situation after an engine starting.

6. The hybrid vehicle control device of claim 5, wherein the processor is further configured to set a turbo operation starting point to the target engine speed when it is determined that the turbo operation is necessary.

7. The hybrid vehicle control device of claim 1, wherein the processor is further configured to determine whether there is a kick down shift request using a shift pattern based on a driver's requested torque and a vehicle speed.

8. The hybrid vehicle control device of claim 1, wherein the processor is configured to t set the target engine speed to a target motor speed and to perform the engine clutch engagement control when the target motor speed is higher than the target engine speed under a condition that there is no kick down shift.

9. The hybrid vehicle control device of claim 8, wherein the processor is further configured to determine whether to perform the kick down shift based on a change amount in the vehicle driving situation or a difference between the target motor speed and the target engine speed when there is no kick down shift request.

10. The hybrid vehicle control device of claim 9, wherein, in a case in which the change amount in the vehicle driving situation is equal to or less than a predetermined first reference vale or the difference between the target motor speed and the target engine speed is equal to or less than a predetermined second reference value,
    the processor is further configured to:
    determine whether the difference between the target motor speed and the target engine speed is greater than zero; and
    again set the target engine speed to a target speed and to perform engine speed control when the difference between the target motor speed and the target engine speed is equal to or less than zero.

11. The hybrid vehicle control device of claim 9, wherein the processor is further configured to generate a target gear step by reducing a current gear step when the change amount in the vehicle driving situation is greater than a predetermined first reference vale or the difference between the target motor speed and the target engine speed is greater than a predetermined second reference value.

12. The hybrid vehicle control device of claim 11, wherein the processor is further configured to compare the target motor speed with the target engine speed when there is the kick down shift request, and to again set the target gear step by reducing a current target gear step when the target motor speed is greater than the target engine speed.

13. The hybrid vehicle control device of claim 9, wherein the processor is further configured to increase a motor speed when the difference between the target motor speed and the target engine speed is greater than zero.

14. The hybrid vehicle control device of claim 13, wherein the processor is further configured to:
    determine whether an absolute value of the difference between the target motor speed and the target engine speed is equal to or less than a predetermined third reference value; and
    perform the engine clutch engagement control when the absolute value of the difference between the target motor speed and the target engine speed is equal to or less than the predetermined third reference value.

15. A vehicle system comprising:
    a hybrid vehicle control device configured to set a target engine speed based on vehicle driving situation, determine presence or absence of a kick down shift based on the vehicle driving situation, and perform engine clutch engagement control according to a result of the kick down shift; and
    one or more sensors configured to sense a vehicle periphery situation and apply the vehicle periphery situation to the hybrid vehicle control device,
    wherein hybrid vehicle control device is further configured to perform the engine clutch engagement control when a target motor speed is higher than the target engine speed due to the kick down shift in a case in which the processor determines that there is a kick down shift request.

16. A hybrid vehicle control method comprising:
    setting a target engine speed based on a vehicle driving situation;
    determining presence or absence of a kick down shift based on the vehicle driving situation; and
    performing engine clutch engagement control according to a result of the kick down shift, wherein the performing of the engine clutch engagement control includes performing the engine clutch engagement control when a target motor speed is higher than the target engine speed due to the kick down shift in a case in which there is a request for the kick down shift.

17. The hybrid vehicle control method of claim 16, wherein the performing of the engine clutch engagement control includes setting the target engine speed to a target motor speed when the target motor speed is higher than the target engine speed, and performing the engine clutch engagement control, in a case in which there is no request for the kick down shift.

18. The hybrid vehicle control method of claim 16, wherein the setting of the target engine speed includes:
- calculating an engine operating point based on a driver's requested torque and a state of charge (SOC) state and starting an engine when the engine operating point reaches a predetermined reference value;
- determining whether a turbo operation is necessary based on the driver's requested torque and the SOC state; and
- setting a turbo operation starting point to the target engine speed when the turbo operation is necessary.

* * * * *